L. ARNOLD & J. B. ATWOOD.
Improvement in Lock-Nuts.
No. 129,706.   Patented July 23, 1872.
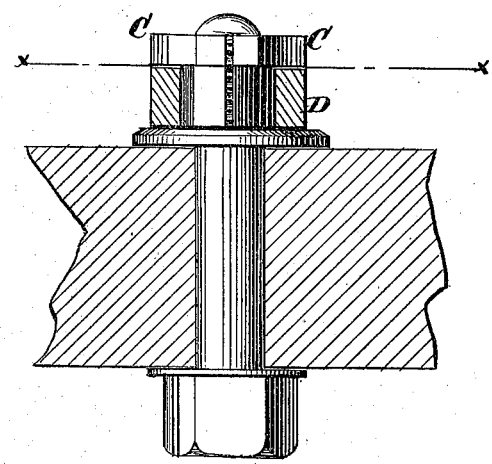
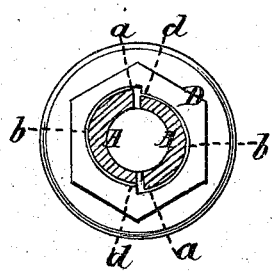
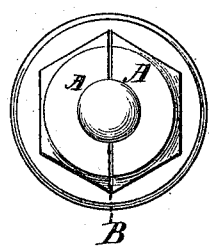

UNITED STATES PATENT OFFICE.

LEVI ARNOLD, OF BELCHERTOWN, AND JAMES B. ATWOOD, OF PALMER, MASSACHUSETTS.

IMPROVEMENT IN LOCK-NUTS.

Specification forming part of Letters Patent No. 129,706, dated July 23, 1872.

Specification describing a new and Improved Nut-Lock, invented by LEVI ARNOLD, of Belchertown, in the county of Hampshire and State of Massachusetts, and JAMES B. ATWOOD, of Palmer, in the county of Hampden and State of Massachusetts.

Our invention consists of a nut divided in halves or more pieces in the lengthwise direction of the bolt, each part having a portion of its exterior surface constructed in a concentric line and a portion constructed in an eccentric line, with which divided nut is combined a washer with concentric and eccentric parts in the wall of the hole through it, corresponding to the said concentric and eccentric parts of the sectional nut, in such manner that, after the nut is screwed home, the washer, being turned so as to force its eccentric parts up the eccentric parts of the nut, will bind the threads of the nut in the threads of the screw so as to hold it on the bolt by friction. The eccentric parts of the washer are turned entirely up onto the concentric parts of the nut and are held thereon against sliding back, as they would if allowed to rest on the eccentric parts of the nut. The washer is prevented from coming off the nut by a collar on the latter.

Figure 1 is a side elevation of the bolt and nut and a section of the washer of my improvement. Fig. 2 is a horizontal section of Fig. 1 on the line $x\,x$, and Fig. 3 is a plan view.

Similar letters of reference indicate corresponding parts.

The nut is in this example represented by the two parts A, divided on the line B. Said two parts have a flange, C, at the upper side, but below said flange they are considerably reduced in size, and the exterior surfaces are formed on concentric lines from $a$ to $b$, and on eccentric lines from $b$ to $d$. D is a washer, fitted to these parts, with concentric parts $a\,b$ and eccentric parts $b\,d$ exactly corresponding to the nut, and so as to be easily put on the nut when the latter is secured on the bolt, but so as to bind said nut firmly against the bolt when, after screwing the nut home, the washer is turned by a wrench on the nut far enough to bring the eccentric parts $b\,d$ of the washer around on the concentric parts of the nut, thus holding the nut so that it cannot unscrew. The corners or points $d$ of the washer, being turned fully onto the concentric parts of the nut beyond the junction of the eccentric parts with the said concentric parts, will be held thereon against turning back. To unscrew the nut the washer is first turned back with a wrench to release the pressure of the latter on the bolt; then they can both be screwed off together. This divided nut may be taken off a long bolt without screwing it to the end, as in the case of solid nuts, by having the washer in its place on the seat and screwing the nut out of the washer, when the separate parts may be taken off the bolt. The washer can then be lifted off the bolt, and by the reverse operation the nut may be put on.

Having thus described our invention, we claim as new and desire to secure by Letters Patent—

The combination of a divided nut, having the concentric parts $a\,b$ and eccentric parts $b\,d$ on the face, with a washer having corresponding concentric and eccentric parts in the walls of its hole, and fitted to the nut, as described, the said nut either having the collar C or not, substantially as specified.

LEVI ARNOLD.
J. B. ATWOOD.

Witnesses:
FRANKLIN DICKINSON,
MARTIN SEDGWICK.